United States Patent [19]

Jain

[11] Patent Number: 5,434,776

[45] Date of Patent: Jul. 18, 1995

[54] METHOD AND SYSTEM FOR CREATING MULTI-LINGUAL COMPUTER PROGRAMS BY DYNAMICALLY LOADING MESSAGES

[75] Inventor: Naveen K. Jain, Redmond, Wash.

[73] Assignee: Microsoft Corporation, Redmond, Wash.

[21] Appl. No.: 976,445

[22] Filed: Nov. 13, 1992

[51] Int. Cl.⁶ .................. G06F 17/20; G06F 17/28
[52] U.S. Cl. .................. 364/419.1; 364/419.03; 364/419.16
[58] Field of Search .......... 364/419.16, 419.17, 364/419.1, 419.03; 395/145, 148, 155, 200

[56] References Cited

U.S. PATENT DOCUMENTS

| | | | |
|---|---|---|---|
| 4,365,315 | 12/1982 | Jamnik | 364/DIG. 2 |
| 4,558,302 | 12/1985 | Welch | 340/347 DD |
| 4,566,078 | 1/1986 | Crabtree | 364/DIG. 2 |
| 4,595,980 | 6/1986 | Innes | 364/DIG. 1 |
| 4,615,002 | 9/1986 | Innes | 364/419 |
| 4,700,322 | 10/1987 | Benbassat | 364/DIG. 2 |
| 4,731,735 | 3/1988 | Borgendale et al. | 364/419 |
| 4,782,325 | 11/1988 | Jeppsson et al. | 341/55 |
| 4,949,302 | 8/1990 | Arnold et al. | 364/DIG. 2 |
| 5,009,276 | 4/1991 | Raikes et al. | 177/25.15 |
| 5,063,522 | 11/1991 | Winters | 395/51 |
| 5,127,748 | 7/1992 | Okimoto et al. | 400/70 |
| 5,155,849 | 10/1992 | Westfall et al. | 395/600 |
| 5,280,575 | 1/1994 | Young et al. | 395/148 |
| 5,307,205 | 4/1994 | Winans | 364/419.01 |

FOREIGN PATENT DOCUMENTS

0335139A2 10/1989 European Pat. Off.
0426909A1 5/1991 European Pat. Off.

OTHER PUBLICATIONS

Patent Abstracts of Japan, vol. 10, No. 361, p. 523, Dec. 4, 1986.

Primary Examiner—Robert A. Weinhardt
Assistant Examiner—A. Bodendorf
Attorney, Agent, or Firm—Seed and Berry

[57] ABSTRACT

A method and system for creating multi-lingual computer programs by dynamically loading messages is provided. In a preferred embodiment, a user specifies a preferred language in which the computer program will communicate. The computer program has one or more associated message sets, each set in a unique natural language. At least some of the message sets are preferably stored in a message file on the computer system. After the computer program is invoked, a Localizer searches the message file for a message set in the preferred language. After selecting the message set, the Localizer makes a memory allocation request, loads the selected message set into the allocated memory, passes the address of the allocated memory to the computer program, and returns control to the computer program.

9 Claims, 3 Drawing Sheets

*Figure 1*
*(Prior Art)*
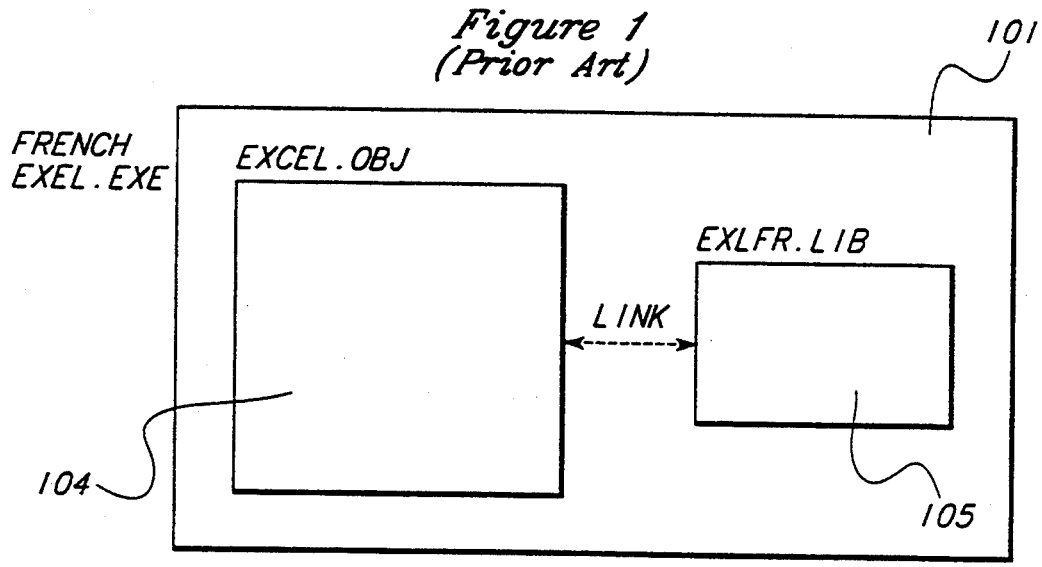
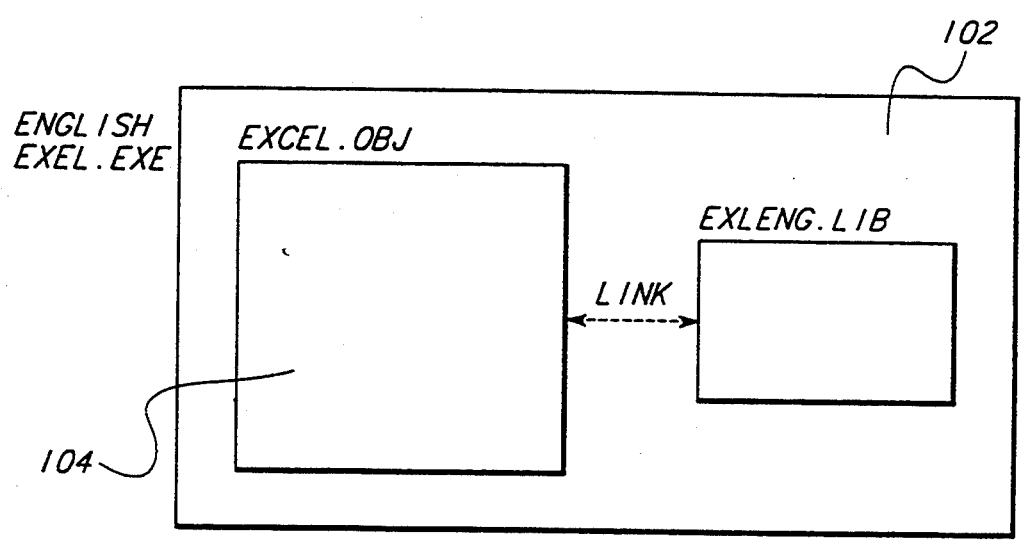
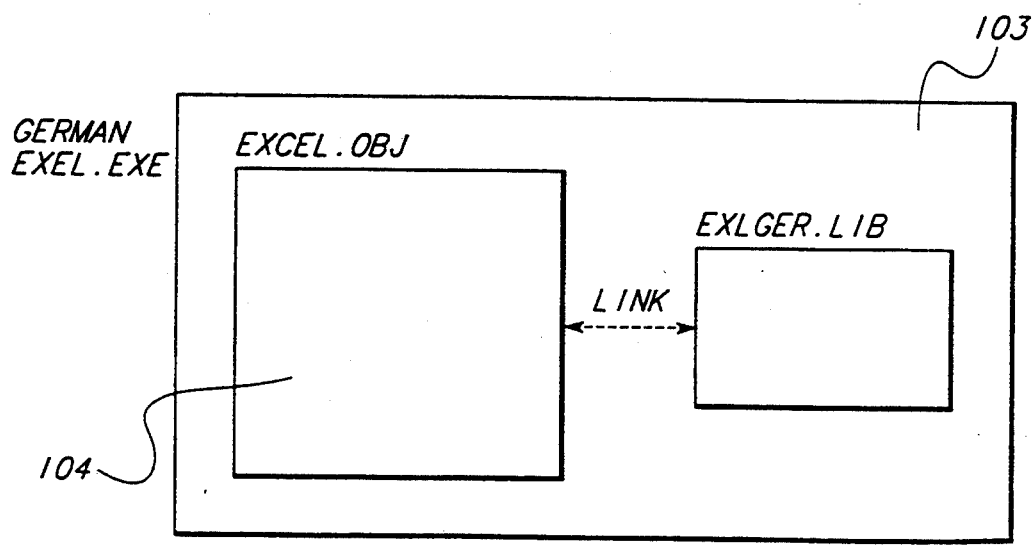

METHOD AND SYSTEM FOR CREATING MULTI-LINGUAL COMPUTER PROGRAMS BY DYNAMICALLY LOADING MESSAGES

TECHNICAL FIELD

This invention relates to a method and system for creating multi-lingual computer programs by dynamically loading messages.

BACKGROUND OF THE INVENTION

Localization is the process of altering a computer program so it is appropriate for the intended geographic area or user group. For example, a computer program running on a computer system in the United States would typically communicate with a user in English, while the same computer program running on a computer system in France would typically communicate with a user in French. The two different versions of the computer program would be essentially the same except for the natural language employed by the program's user interface. If two different users, one German and one French, desired to use the same computer system, then computer programs running on the system would have to have to be localized for German and French users.

In the past, computer systems accommodated multilingual communication by storing different natural language versions of computer programs. Thus, a French user would load a French version of a computer program and a German user would load a German version of a computer program. If a user required that the computer system's operating system communicate in a certain natural language, then the user would initialize (re-boot) the computer system to install the correct natural language version of the operating system. Storing and loading two versions of the same operating system on a computer system is an inefficient use of resources.

Currently, software developers spend a great deal of time localizing a computer program because each message that is output to a user must be translated into the appropriate language. When output messages are stored within the code of a computer program, a developer must have access to the entire program to translate messages. This access requirement is inconvenient because most programs consist of many modules that are linked together to make an executable program.

Software developers use resource files to store output messages rather than storing the messages directly in the program's code. This method eases translation because the messages to be translated are together in one file. To output a message, a program would retrieve the message from the appropriate resource file. Different resource files are used for each natural language. Developers create multiple natural language versions of the program by carrying out the following steps: 1) create a new resource file by translating the messages in an existing resource file into a desired natural language; 2) compile the new resource file; and 3) create an executable file by linking the .compiled program modules with the translated, compiled resource file. Each natural language version of the program requires an executable file that contains all of the compiled program modules and the compiled resource file linked together.

FIG. 1 is a block diagram of sample prior art executable files 101, 102, and 103. Executable file 101 represents a French version of the program Microsoft Excel. EXCEL.OBJ 104 represents all of the compiled program modules that make up-Microsoft Excel. EXLFR.LIB 105 represents a compiled resource file containing all of the messages associated with Microsoft Excel. The executable file 101 consists of the compiled program modules 104 linked with the compiled resource file 105. Executable programs 102 and 103 represent English and German versions, respectively, of Microsoft Excel. Note how the same compiled program modules 104 are present in each of the executable programs 101, 102, and 103. Because the compiled program modules 104 are quite large (approximately 2 megabytes), it is wasteful to require that each natural language version contain the compiled program modules.

SUMMARY OF THE INVENTION

The present invention provides a method and system for creating multi-lingual computer programs using dynamic message loading. In a preferred embodiment, a user of a computer system specifies a preferred language in which the user would like a computer program to communicate. The computer program communicates with the user by directing the computer system to output messages. The computer program has one or more associated message sets, which are lists of messages used by the computer program, each message set in a unique natural language. A message file containing message sets for one or more computer programs is stored on the computer system.

Alternatively, message sets associated with a computer program can be stored in a header area of the computer program. Preferably, a message set in a default natural language is stored in the header area of the computer program.

After the computer program is invoked, a Localizer searches the message file for a message set in the preferred language and associated with the computer program. Alternatively, before searching the message file, the Localizer searches the header area of the computer program for a message set in the preferred natural language. If a message set is not located in the header area, the Localizer then searches the message file. If the Localizer does not locate a message set in the preferred language in either the header area of the computer program or in the message file, the Localizer searches the header area of the computer program for a message set in the default language. After selecting the message set (either preferred or default), the Localizer makes a memory allocation request, requesting enough memory from the computer system to load the selected message set. The Localizer then loads the selected message set into the allocated memory and passes the address of the allocated memory to the computer program. After the message set in the preferred or default language is loaded into the computer system's memory, the Localizer returns control to the computer program.

BRIEF DESCRIPTION OF THE DRAWINGS

FIG. 1 is a block diagram of sample prior art executable programs.

DETAILED DESCRIPTION OF THE INVENTION

The present invention includes a method and system for creating multi-lingual computer programs by dynamically loading messages. A computer program running on a computer system directs the computer to communicate with a user through the use of messages. Computer systems commonly communicate with a user by displaying output message to the user via a display device attached to the computer system and by receiving input messages from the user via a keyboard attached to the computer system. Other methods of receiving and outputting messages are known to those in the computer field.

In a preferred embodiment, the messages associated with a computer program are not stored within the code of the program. Instead, the messages are stored separately from the computer program so that the messages can be easily translated into other natural languages. Messages (in every supported natural language) are preferably contained in a message file, which is stored on the computer system.

The message file contains a plurality of message sets, with each set containing all messages associated with a computer program in a unique natural language. A message identifier is used within the code of the computer program to refer to a message stored within the message file. In an alternate embodiment of the present invention, message sets can be stored in a header area of the computer program rather than in the message file. The header area is a block of data containing details about the program and is usually found at the beginning of the program. The header area is not loaded into memory when the program is invoked.

Before a user invokes a computer program on the computer system, the user specifies a preferred natural language in which the user would like to communicate with the computer program. When the computer program is invoked, a Localizer provided by the present invention searches the message file, selecting messages that are associated with the invoked computer program in the preferred natural language. The. Localizer then loads the selected messages into the computer system's memory. As the computer program executes, it references the selected messages in memory.

Because messages associated with a computer program are not stored within the program or linked to the compiled program, a developer may modify or translate messages without having access to the program. As long as the message identifier within an instruction of the program can be matched to a-message identifier within a particular message set, the body of the executable program is independent of the messages.

Figure 2:
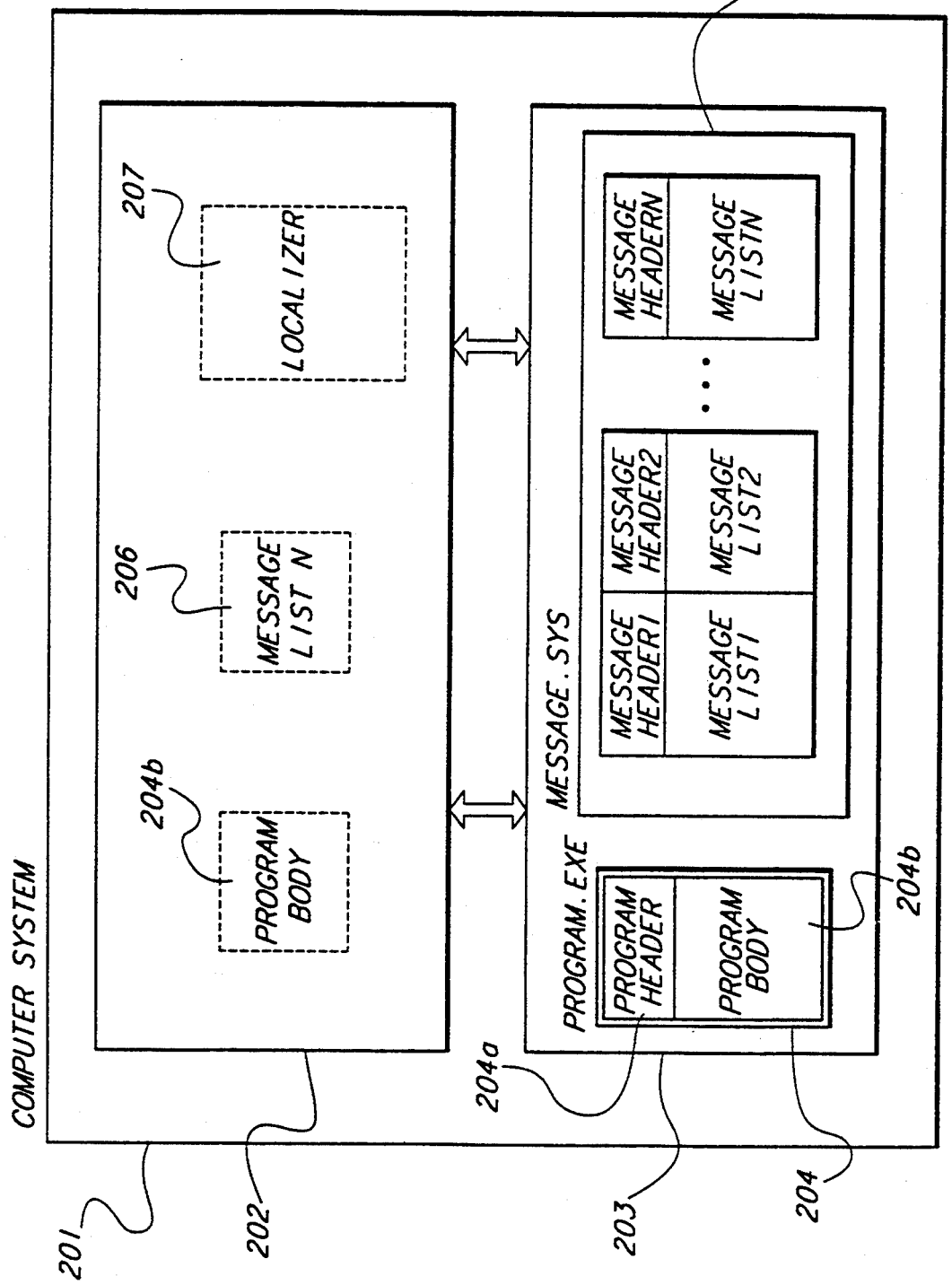
FIG. 2 is a block diagram of a computer system used in a preferred embodiment of the present invention.

FIG. 2 is a diagram of a computer system 201 used in a preferred embodiment of the present invention. The computer system 201 contains a memory device 202 and a storage device 203. A plurality of executable programs can be stored on the storage device 203. Program.exe 204 is an example of such an executable program. Program.exe 204 has two parts, a program header 204a and a program body 204b. As explained above, the program header 204a is a block of data containing the size, location, and other details about Program.exe 204. The program body 204b contains instructions written in a binary format so that they can be loaded into the memory device 202 and executed by the computer system.

In a preferred embodiment, a message file containing a plurality of message sets is also stored on the storage device 203. Message.sys 205 is an example of such a message file. Message.sys 205 comprises a plurality of message sets, each message set containing the messages associated with a computer program. More than one message set can be associated with each computer program that is stored on the storage device 203. For example, message sets 1 through N are all associated with Program.exe 204. Each message set (1-N) contains the messages associated with Program.exe 204 in a unique natural language.

Each message set is made up of a message header and a message list. Similar to a program header, a message header is a block of data containing information about a message set. A message set is always preceded by a message header. Table 1 shows the contents of a message header used in a preferred embodiment of the present invention.

TABLE 1

| MESSAGE_HEADER | | |
| --- | --- | --- |
| Comp_Size | Word | ;Size of the compressed message list |
| Exp_size | Word | ;Size of the decompressed message list |
| Lang_Code | Byte(3) | ;3 character Language code |
| Country_Id | Word | ;Country Identification number |
| Code_page | Word | ;Code page number |
| Prog_Name | Word | ;Name of program that uses messages |
| Signature | Word | ;Signature(NS) |
| Reserved | byte(5) | ;Reserved for future use. |

Comp_Size indicates the size of the message list when the message list is compressed. Exp_Size indicates the size of the message list when the message list is not compressed. Lang_Code indicates in which natural language the message list is written. Country_Id indicates in which country the natural language identified in Lang_Code is spoken. Prog_Name indicates the name of the program or utility that uses the messages associated with this message header. Comp_Size, Exp_Size, Lang_Code, and Country_Id are all explained in more detail below. Code_page, Signature, and Reserved are not relevant to the present description and will not be discussed further.

Figure 3:
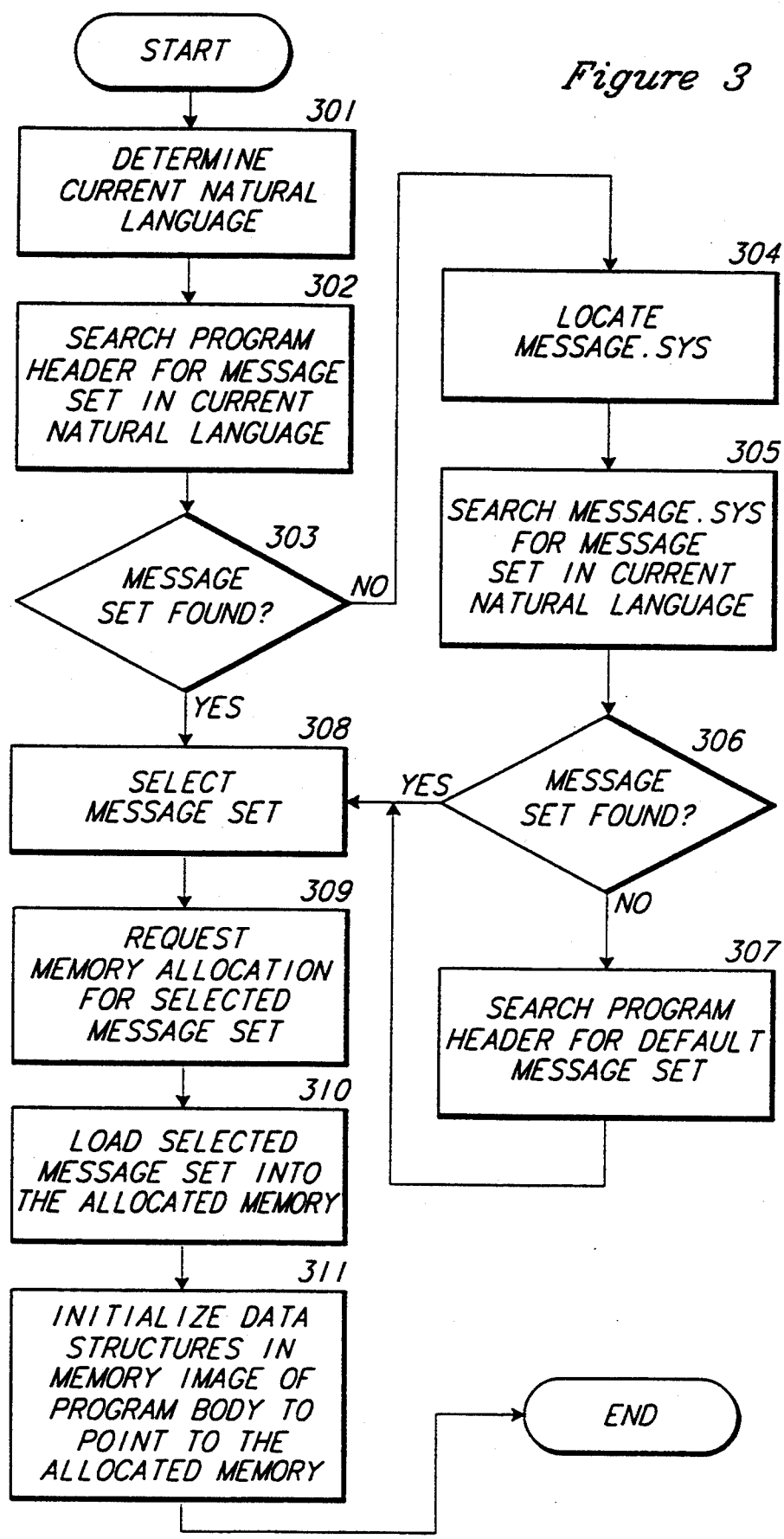
FIG. 3 is a detailed flow diagram of a method used in a preferred embodiment of the present invention.

FIG. 3 is a detailed flow diagram of a method used in the preferred embodiment of the present invention to allow a user of a computer system to communicate with a computer program in a preferred natural language. When a user of a computer system invokes an executable computer program, a copy of the program's body is loaded into the computer system's memory device. In this example, the user has invoked Program.exe 204 so that a copy of Program.exe's body 204b has been loaded into the memory device 202. Also shown loaded into the memory device 202 is a copy of a Localizer 207, which is a computer program used to carry out the methods of the present invention (see FIG. 2). Of course, the Localizer 207 could be made a part of another program (i.e., Program.exe) instead of being a separate program.

After the user has invoked Program.exe, in step 301 of FIG. 3 the Localizer determines which natural language is the preferred natural language. The preferred natural language is the language in which the user of the computer system 201 prefers to communicate with Program.exe. Preferably, the user always specifies the preferred natural language before invoking a computer program, but it is not a necessity. In step 302 the Localizer searches the program header 204a for a message set in the preferred natural language. The Localizer only has to check the language code identifier in the message header of any message sets stored in program header 204a. If such a message set is not found in the program header 204b, then the Localizer searches the storage device 203 for the message file Message.sys 205. If Message.sys 205 cannot be found on the storage device 203, then the Localizer will prompt the user for the location of the message file. If the user cannot direct the Localizer to the location of the message file, then the Localizer searches the program header 204a for a message set in a default language. In a preferred embodiment, a message set in a default language is stored within a program header so that the invoked program has some means for communicating with the user. If the Localizer could not locate a message set in the preferred natural language or message set in a default natural language, then Program.exe would have no way of communicating with the user to tell the user that the message file 205 is not stored on the storage device 203.

After Message.sys 205 is located on the storage device 203, in step 305 the Localizer searches Message.sys file 205 for a message set in the preferred natural language. If such a message set is not found, the Localizer selects a message set in a default natural language from the program header 204a for the reasons stated above.

After steps 301 to 307 have been performed, the Localizer has located one of the following: a message set in the preferred natural language in the program header 204a; a message set in the preferred natural language in Message.sys 205; or a message set in a default natural language in the program header 204a. In step 308, the Localizer selects the located message set. In step 309, the Localizer makes a memory allocation request, requesting a block of memory from the memory device 202. In step 310, the Localizer loads the message list from the selected message set into the allocated memory. In step 311 the Localizer initializes Program.exe's data structures to point to the memory where the message list was loaded. The Localizer then returns control of the computer system to Program.exe. Program.exe communicates with the user of the computer system by referencing messages in the message list that is loaded into the computer system's memory device.

It can be seen then that the preferred embodiment described herein permits easy and efficient storage and selection of multiple natural language versions of a program. A first user of a computer system can specify the language in which the first user would like to communicate with a program, and then a second user can specify a different language in which the second user would like to communicate with the program.

Although the methods and systems of the present invention have been described in terms of a preferred embodiment, it is not intended that the invention be limited to this embodiment. Modification within the spirit of the invention will-be apparent to those skilled in the art. The scope of the present invention is defined only by the claims that follow.

I claim:

1. In a computer system having a storage device and a memory device, a method of facilitating communication in a preferred natural language between a user of the computer system and a computer program executing on the computer system, wherein the computer program includes a program header and a program body, the method comprising the steps of:

providing a message file Stored on the storage device, the message file comprising a second plurality of message sets, each of the second plurality of message sets comprising one or more messages that are associated With the computer program in a unique natural language;

loading the program body of the computer program into the memory device for execution on the computer system, the program header of the computer program storing a first plurality of message sets, each message set having one or more messages that are associated with the computer program in a unique natural language;

receiving user input specifying the preferred natural language;

searching the first plurality of message sets stored in the program header to locate a message set containing messages associated with the computer program in the preferred natural language;

when a message set containing messages in the preferred natural language is located in the program header, loading the located message set from the program header onto the memory device;

when a message set containing messages in the preferred natural language is not located in the program header, searching the second plurality of message sets stored in the message file to locate a message set containing messages associated with the computer program in the preferred natural language; and when a message set containing messages in the preferred natural language is located in the message file, loading the located message set from the message file onto the memory device; and passing an address associated with the loaded message set to the program body loaded on the memory device, the address indicating where in the memory device the located message set is loaded.

2. The method of claim 1 including, subsequent to the step of receiving user input specifying the preferred natural language, the step of storing the received user input on the storage device.

3. The method of claim 1 wherein the computer program contains data structures for identifying a location on the memory device of a message set associated with the computer program and wherein the step of passing an address includes initializing the computer program's data structures to point to the location on the memory device of the located message set.

4. The method of claim 1 wherein the plurality of messages sets in the message file are stored in a compressed manner and wherein the step of loading the located messages set includes the step of decompressing the located message set.

5. In a computer system having a memory device and a storage device, a method of localizing output messages used by an executable program stored on the storage device, the executable program having a program header and a program body, the program header containing a message set, the message set comprising a plurality of output messages used by the executable program in a unique natural language, the method comprising the steps of:

invoking the executable program on the computer system so that the program body is loaded onto the memory device;

receiving user input specifying a preferred natural language;

searching the program header for a message set in the preferred natural language;

after locating the message set in the preferred natural language, requesting a block of memory in the memory device in which to load the message set;

loading the message set into the block of memory; and passing an address associated with the loaded message set to the program body loaded on the memory device, the address indicating where in the memory device the located message set is loaded.

6. The method of claim 5 wherein the located message set is compressed and the step of loading the located message set includes the step of decompressing the located message set.

7. The method of claim 5 including the steps of prompting a user of the computer system to specify a preferred natural language and storing on the storage device the preferred natural language.

8. A computer system for communicating with a user in a preferred natural language, the computer system having a computer program running thereon, the computer program comprising a program header and a program body, the computer system also having an input device for receiving user input specifying the preferred natural language, a storage device, and a memory device, the computer system comprising:

a first plurality of message sets stored in the program header, each message set comprising one or more messages that are associated with the computer program in a unique natural language;

a message file stored on the storage device, the message file comprising a second plurality of message sets, each message set comprising one or more messages that are associated with the computer program in a unique natural language; and a localizer for searching the program header and the message file to locate one message set containing messages associated with the computer program in the preferred natural language, for loading the located message set at a location on the memory device, and for notifying the computer program of where in the memory device the located message set is loaded.

9. The computer system of claim 8 wherein the second plurality of message sets in the message file are stored in a compressed manner and wherein the localizer includes means for decompressing the located message set.

* * * * *

UNITED STATES PATENT AND TRADEMARK OFFICE
CERTIFICATE OF CORRECTION

PATENT NO. : 5,434,776

DATED : July 18, 1995

INVENTOR(S) : Naveen K. Jain

It is certified that error appears in the above-indentified patent and that said Letters Patent is hereby corrected as shown below:

In column 6, claim 1, line 1, please delete "Stored" and substitute therefor --stored--.
In column 6, claim 1, line 5, please delete "With" and substitute therefor --with--.
In column 6, claim 1, lines 24 to 38, that portion of the claim which reads:

when a message set containing messages in the preferred natural language is not located in the program header,
searching the second plurality of message sets stored in the message file to locate a message set containing messages associated with the computer program in the preferred natural language; and
when a message set containing messages in the preferred natural language is located in the message file, loading the located message set from the message file onto the memory device; and
passing an address associated with the loaded message set to the program body loaded on the memory device, the address indicating where in the memory device the located message set is loaded.

should have the following indentation:

when a message set containing messages in the preferred natural language is not located in the program header,
    searching the second plurality of message sets stored in the message file to locate a message set containing messages associated with the computer program in the preferred natural language; and
    when a message set containing messages in the preferred natural language is located in the message file, loading the located message set from the message file onto the memory device; and

UNITED STATES PATENT AND TRADEMARK OFFICE
CERTIFICATE OF CORRECTION

PATENT NO. : 5,434,776  
DATED : July 18, 1995  
INVENTOR(S) : Naveen K. Jain

Page 2 of 2

It is certified that error appears in the above-indentified patent and that said Letters Patent is hereby corrected as shown below:

passing an address associated with the loaded message set to the program body loaded on the memory device, the address indicating where in the memory device the located message set is loaded.

Signed and Sealed this

Twenty-sixth Day of December, 1995

Attest:

BRUCE LEHMAN

*Attesting Officer*  *Commissioner of Patents and Trademarks*